Jan. 31, 1967  E. C. HENRIKSEN  3,301,129
MECHANICAL FOCUS MAINTAINING APPARATUS
Filed Jan. 25, 1965  2 Sheets-Sheet 1
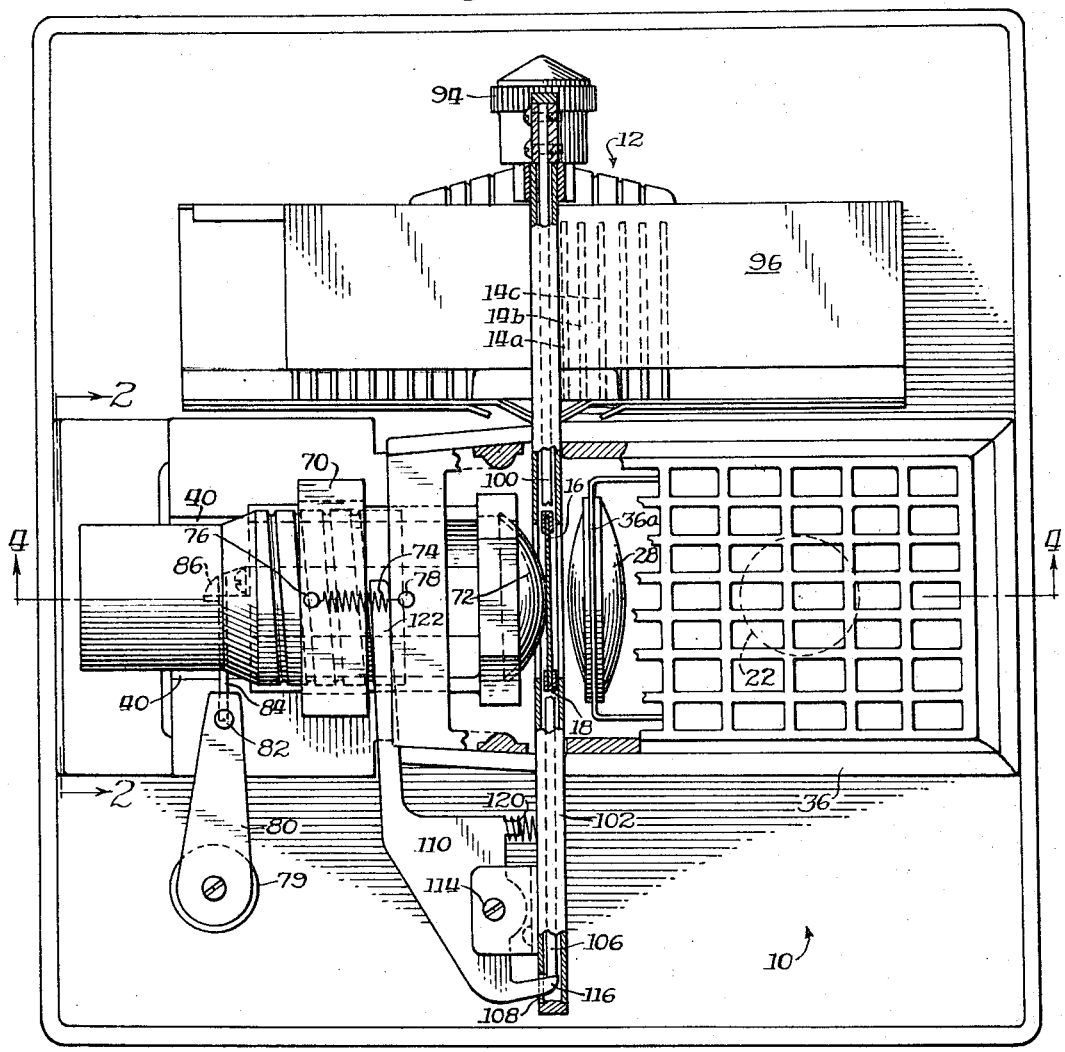
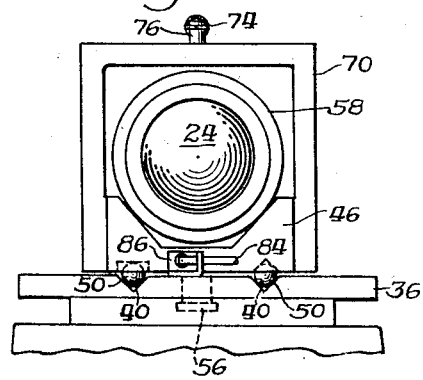
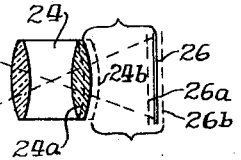
Inventor:
Elmer C. Henriksen.
Barry L. Clark
By John E. Leele Jr.  Attys

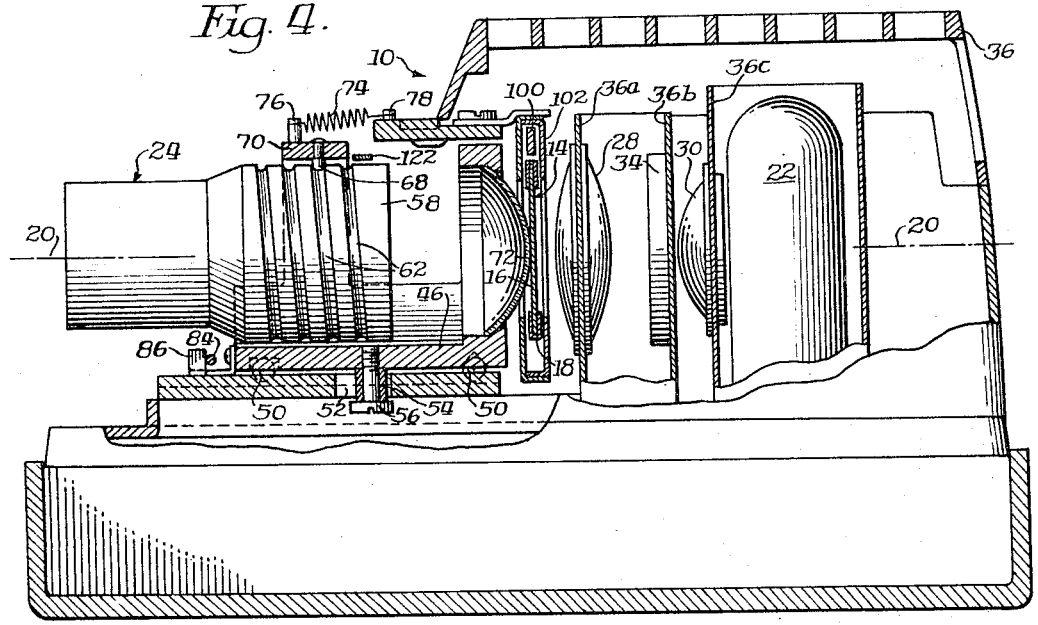
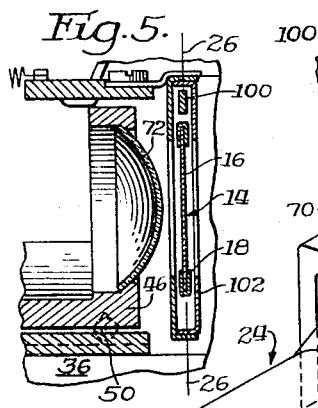
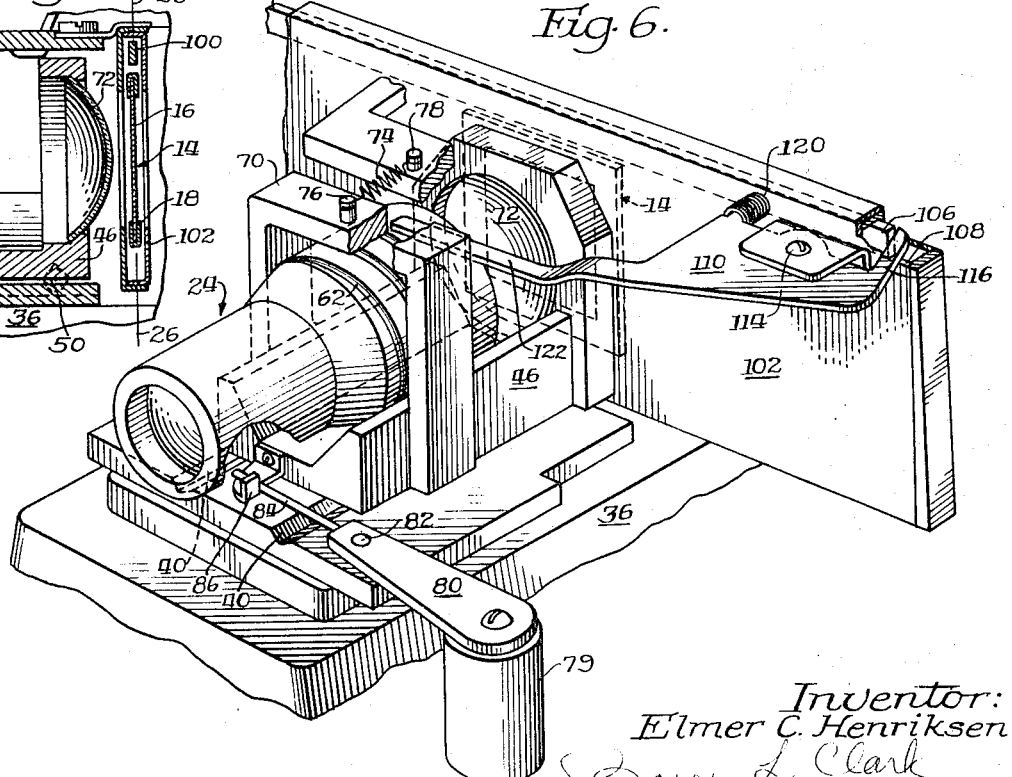
Fig. 4.
Fig. 5.
Fig. 6.
Inventor:
Elmer C. Henriksen.

United States Patent Office

3,301,129
Patented Jan. 31, 1967

3,301,129
MECHANICAL FOCUS MAINTAINING
APPARATUS
Elmer C. Henriksen, Chicago, Ill., assignor to Bell & Howell Company, Chicago, Ill., a corporation of Illinois
Filed Jan. 25, 1965, Ser. No. 427,642
15 Claims. (Cl. 88—28)

The present invention relates to a mechanical focus maintaining apparatus for use with slide projectors.

Several systems for maintaining the focus of projected transparencies or other forms of visual images, generally classed as slides, have been known. Most of these systems have been relatively expensive, complex in construction, and/or inconsistent in the results obtained with them. Some systems, primarily electronic, have enjoyed a degree of success. The mechanical systems have generally determined only the thickness of the slide mounts or the location thereof in a projection lens focal plane but have not successfully compensated for movement of the film or image support, per se, to continuously and accurately maintain focus of the projected image.

Several problems arise in the projection of slides, particularly those of the non-glass bound variety. The slide mounts of more than one manufacturer, or perhaps more than one batch of mounts from the same manufacturer, may vary in thickness sufficiently that the image support material will be located in different planes relative to the projection lens. Each of the slides or a considerable number thereof will require individual focusing of the lens. Similarly, the tension of the image support material due to the method of mounting, the sealing of the mount and the heat and humidity of the atmosphere in the projection room and the slide storage facilities may vary sufficiently to cause even the most carefully mounted slides to deform or "pop" when projected in a projector which has become heated by the projection lamp therein. The effects of the heat of projection lamps on the slide material, although reduced by heat filters, preheating of the slides and other systems, is still considered to be the cause of deformation of the support material after the slide has been projected longer than a five or ten second period.

Therefore, an object of the present invention is to provide a novel apparatus for mechanically maintaining the focus of slides being projected.

Another object is to provide a simple, easily manufactured focus maintaining apparatus, for a slide projector having a freely movable projection lens carriage.

Still another object is to provide a novel slide focus maintaining apparatus in which the image support material of a slide is engaged only when the slide is stationary.

Yet another object of the present invention is to provide a novel slide focus maintaining apparatus including a counterbalance to permit the usual tilting of a projector for image alignment, the projector having a relatively free movable carriage.

An additional object of the invention is to provide a novel slide focus maintaining apparatus operable under the control of a slide changing mechanism to appraise the position of the image support material of each slide from the instant following insertion in the projection axis to the instant preceding removal from the projection axis.

Other objects, features, and advantages of the present invention will become apparent from the following detailed description of certain preferred embodiments thereof taken in conjunction with the accompanying drawings in which:

FIG. 1 is a plan view of a typical slide projector with a typical slide changing mechanism and the focus maintaining apparatus of the present invention;

FIG. 2 is a view taken on section line 2—2 of FIG. 1 particularly disclosing details of the projection lens support carriage mounting;

FIG. 3 is a schematic diagram of the relationships governing the principles of the instant invention;

FIG. 4 is an elevational view taken on section line 3—3 of FIG. 1 with the image support material position sensing element engaging the material, as during projection;

FIG. 5 is a partial view of FIG. 4 with the sensing element remote from the surface of the image support material, as during a slide changing sequence;

FIG. 6 is a perspective view of components of the present focus maintaining apparatus.

FIG. 1 discloses a slide projector 10 having a changer mechanism 12 mounted to position a slide 14 for projection. The slide 14 comprises a film or image support material 16 mounted along its edges in a glassless frame or mount 18, of the known cardboard, plastic, or metal types. The film is generally maintained in a plane (hereinafter referred to as a film or image plane) by the mount. The projectable image area on the film 16 of the slide 14, as defined by the interior periphery of mount 18, is projected along a projection axis 20 by the light of a projection lamp 22 passing through the film and a projection lens 24. Behind the projection lens is a focal plane 26 in which the image plane of the slide must be located to project a sharply focused image upon a remote surface 27, such as a screen. (See FIG. 3.) Between the focal plane 26 and the lamp 22 are located a pair of light condensing lenses 28, 30 and a heat absorbing glass 34. These components are supported in respective portions 36a, 36b, 36c to be maintained aligned on axis 20 in a housing 36.

As seen in FIG. 3, the focal plane 26 of projection lens 24 is the plane with which the film plane must be coincident to project a sharply focused image upon the screen 27. The distance between the focal plane and the lens does not change when the lens to screen distance is unchanged. Film 16 may "pop" so that the major portion of that film shifts the film plane to one of the dotted line positions of the focal plane 26a, 26b. Thus, to regain the necessary coincidence, one of the planes must be moved relative to the other or the remote surface 27 shifted to one of its corresponding dotted line positions 27a, 27b. The latter alternative being undesirable, it will not be further discussed. Therefore, in the preferred form, assuming the film plane shifted to focal plane 26b with the attendant loss of focus on surface 27, the lens 24 is moved to alternate position 24b, thus causing a similar movement of focal plane 26 to position 26b since the focal plane is a fixed distance behind the lens. The lens to screen distance has thus been altered to return the projected image to sharp focus.

The housing 36 has substantially linear guide tracks 40, 40 of a V-configuration formed in the forward portion thereof. A lens support carriage 46 moves freely on substantially frictionless bearings, e.g. balls 50, 50 in the guide tracks. A slot 52 is formed in the housing 36 between the guides to limit the extent of movement of carriage 46 parallel to the projection axis 20. Extending into slot 52 is a roller 54 attached to the carriage by a fastener 56, such as a headed screw. The projection lens 24 is frictionally held on the carriage 46 to permit movement relative to the carriage for initially focusing a projected image on screen 27. The elements of the lens 24 are mounted in a lens barrel 58 having an elongated helical groove 62 therein. A pin 68 extending through a portion 70 of the carriage engages the groove to restrain the movement of lens 24 along the projection axis 20. The initial focusing of the projected image is done by manually pushing or pulling the lens relative to the carriage for rough focusing, and then rotating it in the path of groove 62 for fine focusing. The lens is thereafter moved with the carriage to maintain sharp focus.

Supported on the lens carriage 46 in addition to the projection lens 24 is a film plane sensing device 72. The preferred embodiment of the sensing device is in the form of a relatively thin glass of a curved surface convex to the slide, although it may be formed of transparent plastic materials. The sensing glass is selected with a radius of curvature preferably approximating the focal length of the projection lens. However, a glass having a radius of curvature within a range of one quarter greater or less than the lens focal length does not introduce an undesirable degree of optical aberrations into the projected image. For example, a sensing glass for use with a projector designed for a four inch propection lens will desirably have a four inch radius of curvature but the radius may be between three and five inches. The selected radius of curvature of the sensing glass permits engagement of film 16 while clearing the mount 18. This direct engagement of the film provides accurate sensing or determination of the location of the film plane undistorted and unaffected by the thickness of the slide mount. The sensing glass is fixed to the carriage to be moved therewith and to cause movement thereof.

The carriage 46 is biased rearwardly of the projector by a resilient means 74, such as a small spring, extending between a pin 76 in the portion 70 of the carriage and a similar pin 78 in the housing 36. Spring 74 lightly urges the sensing glass into engagement with substantially the center of the film 16 of a slide 14, which is to be projected.

A counterbalance 79 is attached to a support plate 80 to cause the sensing glass 72 to exert an essentially constant pressure on the film 16 independent of an angle of the projection axis 20 above or below a horizontal plane. The weight of the freely movable carriage 46 with projection lens 24 thereon, plus the force of the spring 74 when the front of the projector is lifted relative to the horizontal plane would apply a greater than desired pressure without the counterbalance. Similarly, the desired slight pressure of the glass on the film would not be maintained when the forward portion of the projector is lowered. Support plate 80 is movable about a lever center 82, such as a pivot pin. Extending from the plate is an elongated rod 84. The end of the rod is preferably loosely engaged in a bracket 86 attached to the central, forward portion of the carriage.

The details of changer mechanism 12 form no part of the present invention and are more fully disclosed in U.S. Patent No. 2,724,989 dated November 29, 1955. The changer mechanism includes a control means 94, such as a knob, for determining the time and sequence of cycling of the slides 14a, 14b, 14c, etc. from and to the magazine 96. A slide manipulating or pusher members 100 is movably carried within a changer casing 102 which is mounted essentially in the focal plane 26. The knob 94 is attached to the pusher 100 to permit longitudinal motion of the pusher in casing 102 to move slides from the magazine into the projection axis or conversely. In the disclosed changer mechanism, rotation of knob 94 moves magazine 96 forwardly or rearwardly of the projector to locate the desired slide in the magazine in the focal plane 26. After projection of this slide, it is returned to the magazine, the magazine indexed and another cycle begun to project the next desired slide.

An actuator member 106 is operably connected with pusher 100 within casing 102 to be moved simultaneously with pusher 100. In this preferred form, the actuator member is an integral extension of the pusher. The actuator is of a length to extend short of an opening 108 in casing 102 when a slide 14 is not in the projection axis 20 but long enough to be moved substantially across the opening when the pusher 100 aligns a slide with the projection axis.

A deactivation link 110 is mounted for pivotal movement about an axis 114 on casing 102. A cam-type finger portion 116 of link 110 is normally urged into the opening 108 and into the path of actuator 106 by a resilient means, such as spring 120. A lever arm 122 of link 110 extends to a position to engage portion 70 of the carriage 46. The carriage is free to be urged rearwardly of the projector by the spring 74 to permit the sensing device 72 to engage the film 16 when the finger 116 is engaged and moved by the actuator 106, since lever arm 122 is moved clear of the carriage portion 70. When the spring 120 urges the lever arm to move the carriage forward, the forward movemnt will deactivate the film plane sensing device 72 by removing it from engagement with the film 16 of the slide 14.

To operate projector 10, a sample slide 14 is moved into the projection axis by actuation of the slide manipulator member 100 through operation of control means 94. The projected image is then aligned on the screen by leveling and tilting the projector in a conventional manner, if necessary. The operator may then proceed to focus the lens 24 to obtain the sharpest image. Once this focusing operation has been accomplished, no additional focusing of this or subsequent slides will be required. The convex surface of sensing device 72 essentially engages the center of the film 16 of slide 14. Assuming that the film now "pops" in a rearward direction, sensing device 72 will follow continuously applying a slight pressure against the film thus maintaining the predetermined focus distance from projection lens 24 the same as when set by the manual focusing operation. Thus, the image on the screen will remain sharp. Similarly, if the film 16 had "popped" in the forward direction, the sensing device 72 would have permitted the lens and carriage 46 to be moved forwardly to maintain the focus. The counterbalance 79 has continuously been operable to maintain an essentially constant pressure of the sensing device on the film.

Following this projection cycle, the operator operates control knob 94 to remove the previously shown slide from projection axis 20, index another slide into the projection plane 26, and move same into the projection axis 20. As this cycling operation was occurring, the sensing device 72 was caused to be removed from the surface of film 16 by the deactivation link 110 to a position as approximately seen in FIG. 4. Subsequently, the deactivation link 110 was released and the carriage returned to the normal position by the urging of spring 120. Counterbalance 79 has acted to dampen the possibly sharp motion of the carriage caused by the cycling. The projected image of this new slide will appear on the screen as sharp as the projected image of the sample slide. Should this slide "pop," the carriage 46 will be caused to follow the direction and degree of such "popping" in the manner as previously described.

It is to be understood that modifications and variations may be effected without departing from the scope of the novel concepts of the present invention.

I claim:
1. A focus determination apparatus for a projector for slides, each of said slides including a film held along its edges in a mount defining the image area to be projected, the image area establishing a film plane capable of shifting upon "popping" of said film during projection, the invention comprising:

a projection lens having an axis along which the image area will be projected;

said lens having a focal plane located a fixed distance behind said lens along said projection axis wherein a projected image is in sharp focus when the film plane is coincident with said focal plane;

means to move a slide into alignment with said projection axis;

support means for relative movement of said projection lens and said aligned slide wherein said focal plane of said projection lens and said film plane of said slide may be made coincident;

a film plane sensing device connected to said support means for movement therewith, said device engaging a portion of said image area of said aligned slide; and means biasing said sensing device into engagement with said image area of said aligned slide wherein said film plane and said focal plane are maintained coincident when said film "pops" and said sensing device moves with said image area.

2. A focus determination apparatus for a projector for slides, each of said slides including a film held along its edges in a mount defining the image area to be projected, the image area establishing a film plane capable of shifting upon "popping" of said film during projection, the invention comprising:

a projection lens having an axis along which the image area will be projected;

said lens having a focal plane located a fixed distance behind said lens along said projection axis wherein a projected image is in sharp focus when the film plane is coincident with said focal plane;

means to move a slide into alignment with said projection axis;

means supporting said projection lens for movement to cause said focal plane to be moved;

a film plane sensing device connected to said support means for movement therewith, said device engaging a portion of said image area of said aligned slide; and means biasing said sensing device into engagement with said image area of said aligned slide wherein said film plane and said focal plane are maintained coincident when said film "pops" and said sensing device moves with said image area.

3. A focus determination apparatus for a projector for slides, each of said slides including a film held along its edges in a mount defining the image area to be projected the image area establishing a film plane shiftable upon "popping" of said film during projection, the invention comprising:

a projection lens determining an axis along which the image area will be projected;

said lens having a focal plane located a fixed distance behind said lens along said projection axis wherein a projected image is in sharp focus when the film plane is coincident with said focal plane;

means to move a slide into alignment with said projection axis;

supporting means for said projecting lens, said lens being movable relative to said supporting means to establish initial coincidence of said film plane and said focal plane;

said projection lens being moved thereafter by said supporting means to cause said focal plane to be moved to maintain coincidence of said focal plane and said film plane;

a film plane sensing device connected to move with said supporting means and adapted to engage a portion of the image area of said slide while said slide is aligned with said projection axis;

means urging said sensing device into engagement with said image area of said aligned slide wherein said film plane and said focal plane are maintained coincident when said image area "pops" and said sensing device moves with said image area; and means actuated by said slide moving means to deactivate said sensing device prior to alignment of said slide with said projection axis and following removal of said slide from alignment with said projection axis.

4. Apparatus as in claim 3 wherein said housing is adapted to be supported such that said projection axis is at an angle relative to a horizontal plane, including counterbalance means connected to said carriage and mounted for pivotal movement in said housing to balance the weight of said freely movable carriage and said projection lens mounted thereon, to limit the force of said sensing device on said film.

5. A projector as in claim 4 wherein said counterbalance is connected to said carriage remote from said focal plane.

6. A projector as in claim 5 wherein said projection lens has a predetermined focal length and said sensing device is a thin glass having a radius of curvature within a range extending from one quarter more than said focal length of said projection lens to one quarter less than said focal length of said projection lens.

7. A focus determination apparatus for a projector for slides, each of said slides including a film held along its edges in a mount defining the image area to be projected, the image area establishing a film plane capable of shifting upon "popping" of said film during projection, the invention comprising:

a projection lens having an axis along which the image will be projected;

said lens having a focal plane located a fixed distance behind said lens along said projection axis wherein a projected image is in sharp focus when the film plane is coincident with said focal plane;

a carriage to support said projection lens for movement substantially parallel to said projection axis;

means on said carriage retaining said lens for adjustment relative to said carriage;

a transparent sensing device connected to said carriage and adapted to engage the image area of a slide aligned with said projection axis;

slide moving mechanism located essentially in the focal plane adapted to sequentially align said image with said projection axis; and means operably connected with said slide moving mechanism to move said carriage wherein said sensing device is maintained in engagement with said film plane to maintain said film plane in coincidence with said focal plane when said slide is aligned with said projection axis.

8. A focus determination apparatus for a projector for slides, each of said slides including a film held along its edges in a mount defining the image area to be projected, the image area establishing a film plane capable of shifting upon "popping" of said film during projection, the invention comprising:

a projection lens having an axis along which the image will be projected;

said lens having a focal plane located a fixed distance behind said lens along said projection axis wherein a projected image is in sharp focus when the film plane is coincident with said focal plane;

a slide moving mechanism located essentially in the focal plane and adapted to sequentially align slides with said projection axis and remove said slides therefrom after projection;

a carriage to support said projection lens for movement substantially parallel with said projection axis;

means on said carriage retaining said lens for movement relative to said carriage;

a sensing device fixedly connected to said carriage adjacent said focal plane and in said projection axis;

said device being adapted to engage the image area of said aligned slide; and means operably connected with slide moving mechanism to permit said sensing device to move into engagement with said image area immediately after said slide is aligned with said projection axis and to move said device out of engagement with said image area immediately before said slide is removed from alignment with said axis.

9. A focus determination apparatus for a projector for slides, each of said slides including a film held along its edges in a mount defining the image area to be projected, the image area establishing a film plane capable of shifting upon "popping" of said film during projection, the invention comprising:
- a housing;
- a projection lens having an axis along which the image will be projected;
- said lens having a focal plane located a fixed distance behind said lens along said projection axis wherein a projected image is in sharp focus when the film plane is coincident with said focal plane;
- a slide moving mechanism located essentially in the focal plane and adapted to align slides with said projection axis;
- a freely movable carriage adapted to support said projection lens and the focal plane for movement;
- said lens being independently movable relative to said carriage;
- bearing means in said housing supporting said carriage for substantially frictionless movement relative to said focal plane;
- a sensing device connected to said carriage;
- said device being adapted to engage slides when aligned in said projection axis;
- means biasing said carriage toward said focal plane;
- means on said slide moving mechanism to deactivate said sensing device by moving said device from adjacent said focal plane when said slide is moved from alignment with said projection axis;
- whereby said projection lens may be manually moved relative to said carriage to initially make said film plane of said aligned slide and said focal plane coincident wherein the film planes of subsequent films will be maintained coincident by positioning of said carriage and lens relative to said aligned slides by said sensing device engaging same.

10. A mechanical focus maintaining system for a projector for slides, each of said slides including a film held along its edges in a mount defining the image area to be projected, the image area establishing a film plane capable of shifting upon "popping" of said film during projection, including:
- a housing having a film storage area therein;
- a projection lens of a predetermined focal length having an axis along which the image area will be projected;
- said lens having a focal plane located a fixed distance behind said lens along said projection axis wherein a projected image is in sharp focus when the film plane is coincident with said focal plane;
- a carriage movable in said housing parallel with said projection axis;
- said carriage supporting said projection lens;
- means intermediate said housing and said carriage permitting said carriage to be freely moved relative to said housing;
- film moving mechanism essentially in said focal plane adapted to move film from said storage area to align said slide in said projection axis;
- a sensing glass having a radius of curvature substantially equal to said focal length of said projection lens, said glass being fixed to said carriage and adapted to engage the image area of said aligned slide;
- an actuator member adpated to be operated when said film moving mechanism causes a slide to be aligned; and
- a sensing device deactivation link adapted to be operated by said actuator member to maintain said sensing device out of engagement with said slide when said slide is located other than in said projection axis.

11. A focus determination apparatus for a projector for slides, each of said slides including a film held along its edges in a mount defining the image area to be projected, the image area establishing a film plane capable of shifting upon "popping" of said film during projection, the invention comprising:
- a projection lens of a predetermined focal length having an axis along which the image area will be projected;
- said lens having a focal plane located a fixed distance behind said lens along said projection axis wherein a projected image is in sharp focus when the film plane is coincident with said focal plane;
- plane adapted to sequentially align slides in said projection axis may be at an angle relative to a horizontal plane;
- a carriage movable on said housing substantially parallel with said projection axis;
- slide moving mechanism located essentially in the focal plane adapted to sequentially align slides in said projection axis;
- a sensing glass having a radius of curvature within a range from one quarter less than the focal length of said projection lens to one quarter more than the focal length of said projection lens;
- said sensing glass being connected to said carriage and adapted to engage essentially the center of the image area of said aligned slide;
- means operably connected with said slide moving mechanism to permit said sensing glass to be moved into engagement with the film of said slide only while said slide is aligned in said projection axis;
- bearing means intermittent said carriage and said housing wherein said carriage is permitted substantially frictionless movement relative to said housing; and
- counterbalance means connected to said carriage and mounted for pivotal movement relative to said housing to balance the weight of said freely movable carriage and said lens mounted thereon so as to limit the force of said sensing glass on the film of said aligned slide.

12. A mechanical focus maintaining system for a projector for slides, each of said slides including a film held along its edges in a mount defining the image area to be projected, the image area establishing a film plane shiftable upon "popping" of said film during projection, the invention comprising:
- a housing;
- a projection lens of a predetermined focal length having a projection axis along which the image area will be projected;
- said lens having a focal plane located a fixed distance behind said lens along said projection axis wherein the projected image is in sharp focus when the film plane is coincident with said focal plane;
- a carriage movable on said housing substantially parallel to said projection axis;
- slide changing mechanism located essentially in the focal plane and adapted to sequentially align slides with said projection axis;
- a film plane sensing glas fixedly mounted on said carriage and adapted to engage essentially the center of the image area of said aligned slide;
- said sensing glass having a radius of curvature, convex in the direction of the focal plane, within a range from one quarter less than the focal length of said projection lens to one quarter more than the focal lens to one quarter more than the focal length of said projection lens;
- means biasing said sensing glass into engagement with said image area of said aligned slide wherein said film plane and said focal plane are maintained coincident when said image area "pops" and said sensing device moves with said image area; and
- means operably connected between said slide changing mechanism and said sensing glass to maintain said sensing glass out of engagement with said slide until said slide is aligned with said projection axis and after said slide is moved out of alignment with said projection axis.

13. A slide projector as in claim 12 including bearing means intermittent said carriage and said housing whereby said carriage is permitted substantially frictionless movement relative to said housing.

14. A slide projector as in claim 13 including counterbalance means connected to said carriage and mounted for pivotal movement relative to said housing to balance the weight of said freely movable carriage and said lens mounted thereon when said housing is tilted from a horizontal plane along said projection axis so as to limit the force of said sensing glass on said film in said projection axis.

15. A focus determination aparatus for a projector for slides, each of said slides including a film held along its edges in a mount defining the image area to be projected, the image area establishing a film plane capable of shifting upon "popping" of said film during projection, the invention comprising:
   a projection lens having an axis along which the image area will be projected;
   said lens having a focal plane located a fixed distance behind said lens along said projection axis wherein a projected image is in sharp focus when the film plane is coincident with said focal plane;
   means to move a slide into alignment with said projection axis;
   support means for relative movement of said projection lens and said aligned slide wherein said focal plane of said projection lens and said film plane of said slide may be made coincident;
   a film plane sensing device connected to said support means for movement therewith, said device engaging a portion of said image area of said aligned slide; and
   means causing relative movement of said sensing device and said slide wherein said film plane and said focal plane are maintained coincident when said film "pops."

References Cited by the Examiner

UNITED STATES PATENTS

| 2,705,438 | 4/1955 | Peto | 88—28 |
| 2,947,215 | 8/1960 | Mitchell | 88—26 X |
| 3,013,469 | 12/1961 | Mulch et al. | 88—26 |
| 3,037,423 | 6/1962 | Shurcliff | 88—26 |

FOREIGN PATENTS

| 1,281,559 | 12/1961 | France. |
| 1,061,537 | 8/1959 | Germany. |

References Cited by the Applicant

UNITED STATES PATENTS

| 2,895,375 | 7/1959 | Wittel. |
| 3,000,258 | 9/1961 | Misuraca. |
| 3,146,666 | 9/1964 | Misuraca. |

JOHN M. HORAN, *Primary Examiner.*

NORTON ANSHER, *Examiner.*

V. A. SMITH, *Assistant Examiner.*